United States Patent
Hodel et al.

(10) Patent No.: US 11,560,908 B2
(45) Date of Patent: Jan. 24, 2023

(54) CONTROL MAPPING FOR HYDRAULIC MACHINES

(71) Applicant: Caterpillar Inc., Deerfield, IL (US)

(72) Inventors: Benjamin John Hodel, Dunlap, IL (US); Nicholas Anthony Payne, Peoria, IL (US); Russell Aaron Schloss, Pittsburgh, PA (US); Corey Lee Gorman, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 792 days.

(21) Appl. No.: 16/410,934

(22) Filed: May 13, 2019

(65) Prior Publication Data

US 2020/0362889 A1 Nov. 19, 2020

(51) Int. Cl.
*F15B 19/00* (2006.01)
*G06N 20/00* (2019.01)
(Continued)

(52) U.S. Cl.
CPC .............. *F15B 19/007* (2013.01); *E02F 3/32* (2013.01); *E02F 3/43* (2013.01); *E02F 9/2267* (2013.01); *F15B 11/04* (2013.01); *F15B 11/161* (2013.01); *F15B 21/087* (2013.01); *G06N 3/084* (2013.01); *G06N 20/00* (2019.01); *F15B 2211/413* (2013.01); *F15B 2211/426* (2013.01); *F15B 2211/6309* (2013.01); *F15B 2211/6313* (2013.01); *F15B 2211/6336* (2013.01); *F15B 2211/6346* (2013.01); *F15B 2211/6654* (2013.01); *F15B 2211/71* (2013.01);
(Continued)

(58) Field of Classification Search
None
See application file for complete search history.

(56) References Cited

U.S. PATENT DOCUMENTS

| 6,047,228 A | 4/2000 | Stone et al. |
| 6,049,738 A | 4/2000 | Kayama et al. |

(Continued)

FOREIGN PATENT DOCUMENTS

| CN | 101027617 A | 8/2007 |
| CN | 102041824 | 5/2011 |

(Continued)

OTHER PUBLICATIONS

"Electrohydraulic Valves." Power&Motion, Dec. 31, 2011, https://www.powermotiontech.com/hydraulics/hydraulic-valves/article/21883861/electrohydraulic-valves. (Year: 2011).*

(Continued)

*Primary Examiner* — James J Lee
*Assistant Examiner* — Andrew Sang Kim
(74) *Attorney, Agent, or Firm* — Lee & Hayes, PLLC

(57) ABSTRACT

A machine control system can store model weights determined via machine learning using a training dataset correlating preset hydraulic valve displacements to measured movement parameters of a machine component. The machine control system can receive an input command for the component and machine state data from machine sensors. A control mapping model can use the model weights to map a combination of the input command and the machine state data into a predicted displacement of the hydraulic valve that causes movement of the component in response to the input command.

20 Claims, 6 Drawing Sheets

(51) Int. Cl.
    *E02F 3/43*     (2006.01)
    *G06N 3/08*     (2006.01)
    *E02F 3/32*     (2006.01)
    *E02F 9/22*     (2006.01)
    *F15B 11/04*     (2006.01)
    *F15B 11/16*     (2006.01)
    *F15B 21/08*     (2006.01)

(52) U.S. Cl.
    CPC ..... *F15B 2211/75* (2013.01); *F15B 2211/755* (2013.01); *F15B 2211/7656* (2013.01)

(56) References Cited

U.S. PATENT DOCUMENTS

| | | |
|---|---|---|
| 9,014,862 B2 | 4/2015 | Morita et al. |
| 2001/0025232 A1 | 9/2001 | Klimasauskas et al. |
| 2016/0333902 A1 | 11/2016 | Hodel |

FOREIGN PATENT DOCUMENTS

| | | | |
|---|---|---|---|
| CN | 102041824 A | * | 5/2011 |
| CN | 106716455 | | 5/2017 |
| EP | 3093400 | | 11/2016 |
| KR | 101584946 B1 | | 1/2016 |

OTHER PUBLICATIONS

Bumjin Song and A. J. Koivo, "Neural adaptive control of excavators," Proceedings 1995 IEEE/RSJ International Conference on Intelligent Robots and Systems. Human Robot Interaction and Cooperative Robots, 1995, pp. 162-167 vol. 1, doi: 10.1109/IROS.1995.525791. (Year: 1995).*

Opdenbosch et al., "Control of Electro-Hydraulic Poppet Valves (EHPV)", Georgia Institute of Technology, Oct. 27, 2004, 38 pages.

Opdenbosch et al., "Learning control appliced to Electro-Hydraulic Poppet Valves", in the Proceedings of the American Control Conference, Jul. 2008, 9 pages.

Chinese Office Action for Int'l. Patent Appln. No. 2020800352502, dated Nov. 14, 2022 (2 pgs).

* cited by examiner

CONTROL MAPPING FOR HYDRAULIC MACHINES

TECHNICAL FIELD

The present disclosure relates to a system and method for mapping controls for hydraulic machines, and more particularly, to using machine learning to find model weights that can map input data into an electric current for a valve displacement that causes a hydraulic machine component to move at a desired velocity.

BACKGROUND

Excavators and other machines often have hydraulically-controlled components. For example, a hydraulic pump linked to hydraulic cylinders can actuate a boom, stick, and/or bucket of an excavator. Conventionally, hydraulic components are often directly controlled mechanically. For example, in conventional mechanical control, movement of a lever can mechanically open or close a hydraulic valve to change the pressure in a hydraulic cylinder and thereby cause movement of a machine component. More recently, machines have been developed that use electrohydraulic controls instead of direct mechanical controls for hydraulic components. Electrohydraulic controls can translate input commands into electric currents or signals that drive actuation of hydraulic components.

For example, P. Opdenbosch, N. Sadegh, and W. Book, "Learning Control Applied to Electro-Hydraulic Poppet Valves," Proceedings of the American Control Conference, 2008, pp. 1525-1532 (hereinafter "Opdenbosch"), describes an electrohydraulic valve that opens proportionally to the amount of electric current sent to a valve solenoid even though that relationship can be nonlinear. In particular, Opdenbosch describes a method of calibrating and controlling an electrohydraulic valve by using a Nodal Link Perceptron Network (NLPN) to learn an inverse input-state mapping for the valve and force the flow conductance of the valve to follow a desired trajectory.

However, although the method described in Opdenbosch may be able to determine an electric current to apply to an electrohydraulic valve to achieve a desired flow conductance, it does not describe how that electric current or corresponding flow conductance of an electrohydraulic valve would translate into an actual velocity of a machine component actuated by the electrohydraulic valve. Even if the flow conductance of a valve can be controlled according to the method described in Opdenbosch, a resulting velocity of an associated machine component may still vary due to other variables, such as hydraulic cylinder pressures, component positions, and other aspects of the state of the machine.

Described herein is a system and method for controlling an electric current provided to an electrohydraulic valve in order to achieve a desired velocity of a machine component actuated by the electrohydraulic valve.

SUMMARY

According to a first aspect, a machine control system for a machine can include memory storing a set of model weights trained using a machine learning system based on a training dataset that correlates preset displacements for a hydraulic valve of a machine to movement parameters of a component of the machine measured when the hydraulic valve is set according to the preset displacements and the component is moved at least in part by the hydraulic valve. The machine control system can also include an input data receiver configured to receive an input command associated with the component of the machine and machine state data from one or more sensors positioned on the machine. The machine control system can have a control mapping model configured to use the set of model weights to map a combination of the input command and the machine state data into a predicted displacement of the hydraulic valve that causes movement of the component in response to the input command.

According to a further aspect, a machine can include a substantially rigid frame, a hydraulic valve configured to open to different displacements, a component connected to the substantially rigid frame. The hydraulic valve can be configured to move the component relative to the substantially rigid frame. The machine can also carry one or more sensors configured to measure machine state data. The machine can further have a machine control system configured to control displacement of the hydraulic valve. The machine control system can include memory storing a set of model weights trained using a machine learning system based on a training dataset that correlates preset displacements for the hydraulic valve to movement parameters of the component measured when the hydraulic valve is set according to the preset displacements and the component is moved at least in part by the hydraulic valve. The machine control system can also include an input data receiver configured to receive an input command associated with the component and the machine state data from the one or more sensors. The machine control system can further include a control mapping model configured to use the set of model weights to map a combination of the input command and the machine state data into a predicted displacement of the hydraulic valve that causes movement of the component in response to the input command.

According to another aspect, a method can include obtaining test sequence data by performing a plurality of test sequences on a machine according to a parameter grid that defines a plurality of predefined valve displacements. Performing a first test sequence of the plurality of test sequences can include actuating a hydraulic valve based at least in part on a first valve displacement of the plurality of predefined valve displacements, wherein actuating the hydraulic valve causes movement of a component of the machine, and measuring first test sequence data indicative of movement of the component caused by actuation of the hydraulic valve. The method can also include training a set of model weights using a machine learning system by using the test sequence data in training data, using the plurality of predefined valve displacements in training labels, and iteratively adjusting the set of model weights until the set of model weights predicts the training labels from the training data such that a loss metric is below a predefined threshold. The method can further include receiving machine state data from one or more sensors on the machine and generating a predicted displacement of the hydraulic valve by using the set of model weights to map a combination of the input command and the machine state data to the predicted displacement. Controlling displacement of the hydraulic valve, based at least in part on the predicted displacement, can cause movement of the component in response to the input command.

BRIEF DESCRIPTION OF THE DRAWINGS

The detailed description is described with reference to the accompanying figures. In the figures, the left-most digit of a FIG. 1 depicts an example of a machine.

DETAILED DESCRIPTION

Figure 1:
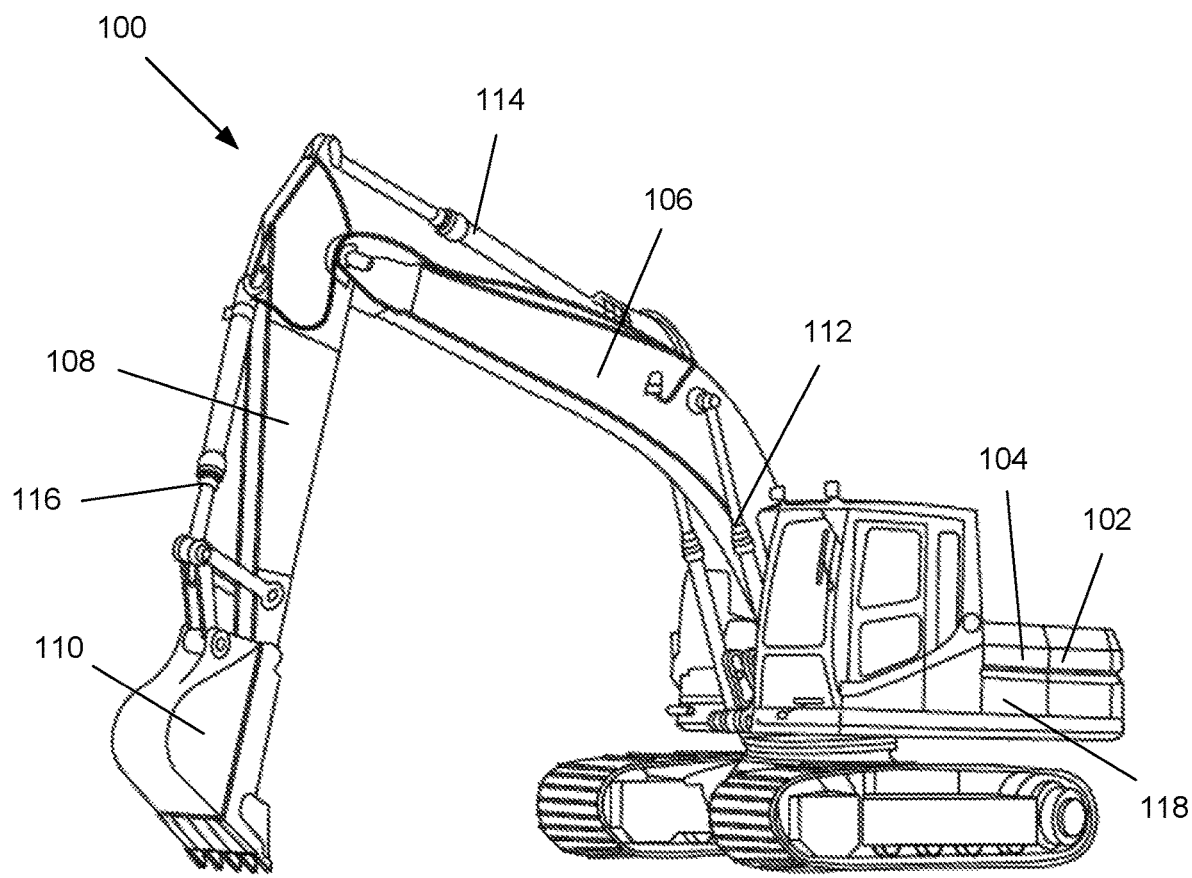

FIG. 1 depicts an example of a machine 100. A machine 100 can have a substantially rigid frame, and include a hydraulic pump 102 and one or more hydraulic valves 104 configured to control pressure of hydraulic fluid within the machine 100 that can actuate one or more hydraulically-controlled components of the machine 100. In the example of FIG. 1, the machine 100 is an excavator with hydraulically-controlled components including a boom 106, a stick 108, and a bucket 110. The hydraulic pump 102 and/or valves 104 can control hydraulic cylinders to actuate movement of one or more of the hydraulically-controlled components. For example, a hydraulic boom cylinder 112 can control movement of the boom 106, a hydraulic stick cylinder 114 can control movement of the stick 108, and a hydraulic bucket cylinder 116 can control movement of the bucket 110 and/or linkage. In other examples, the machine 100 can be any other type of machine with hydraulically-controlled components, such as a wheel loader with a hydraulically-controlled bucket, or a motor grader with a hydraulically-controlled drawbar, circle, and moldboard (DCM).

The machine 100 can be at least partially electrohydraulically controlled, such that an electric current applied to a valve 104 can cause the valve 104 to open or close by different degrees to different valve displacement positions, in turn causing corresponding movement of one or more hydraulically-controlled components. For example, a valve 104 can have a valve solenoid, and an electric current provided to the valve solenoid can be adjusted such that the valve 104 opens or closes to a valve displacement that results in a corresponding movement of a boom 106, stick 108, bucket 110, and/or other hydraulically-controlled component.

The machine 100 can have an electronic control module (ECM) 118. The ECM can be a machine control system that can adjust an electric current, such as a valve solenoid current, provided to one or more valves 104. The ECM 118 can process input data, including operator commands and/or data about the current state of the machine 100, and determine electric currents to be provided to one or more valves 104 that can cause movement of the hydraulically-controlled components. For example, a human operator sitting in a cab of an excavator can move a lever in the cab, or use another type of control, to input an input command, such as a velocity command for a "stick-in" event to move the stick 108 inward at a velocity desired by the operator. As another example, software implementing an autonomous operator can directly output a velocity command or other input command without physical movement of a lever or other control. Velocity commands or other input commands may correspond to different types of functions, operations, or events, such as "stick-in" events, "stick-out" events, "boom-up" events, "boom-down" events, "bucket-curl" events, "bucket-dump" events, or any other event associated with movement of one or more hydraulically-controlled components.

Figure 2:
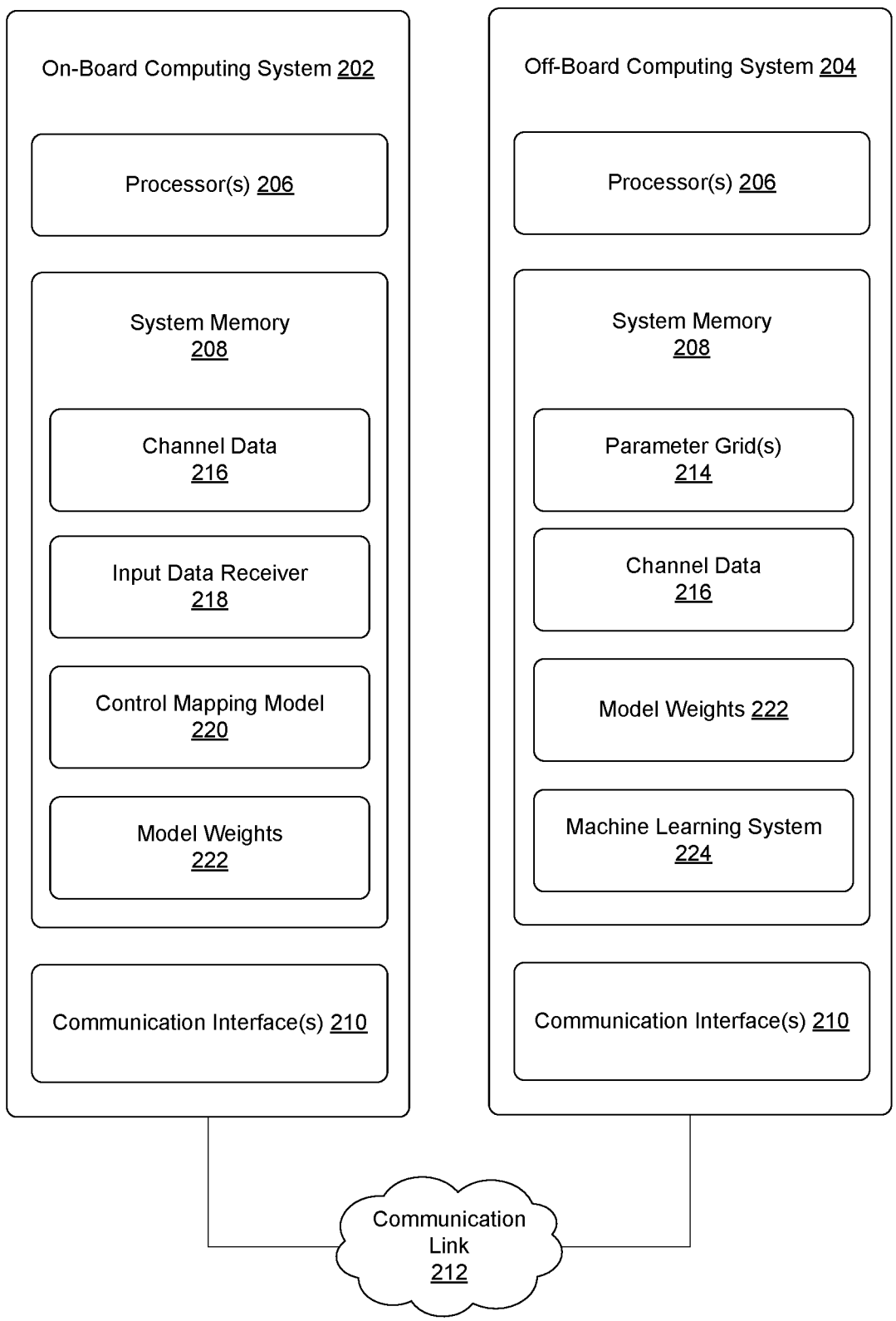
FIG. 2 depicts examples of an on-board computing system and an off-board computing system.

FIG. 2 depicts examples of an on-board computing system 202 and an off-board computing system 204. The on-board computing system 202 can include one or more computing devices or other controllers that are on-board or incorporated into a machine 100, and can include one or more processors 206, system memory 208, and communication interfaces 210. For example, the on-board computing system 202 can be, or include, the ECM 118, a programmable logic controller (PLC), and/or other computing devices. The off-board computing system 204 can be a laptop computer, desktop computer, server, or any other external computing device, and can also include its own processors 206, system memory 208, and communication interfaces 210. In some examples, the on-board computing system 202 and the off-board computing system 204 can use the communication interfaces 210 to communicate with each other via a wired or wireless communication link 212, such as a direct wired connection or a connection through a network.

The on-board computing system 202 can include the ECM 118. In some examples, the ECM 118 can be a computing device that may or may not be linked to other computing devices within the on-board computing system 202. For example, the ECM 118 can be a separate hardware element linked to other elements of the on-board computing system 202, such as a dedicated controller with its own processors 206, system memory 208, and/or communication interfaces 210. The ECM 118 can have a system memory 208 that stores computer-executable instructions and other data associated with the operations described herein, and one or more processors 206 of the ECM 118 can execute the computer-executable instructions associated with the ECM 118. In other examples, the ECM 118 can be a software module such that computer-executable instructions and other data associated with the ECM 118 can be stored and/or executed by one or more other computing devices of the on-board computing system 202.

The processor(s) 206 may operate to perform a variety of functions, as set forth herein. In some examples, the processor(s) 206 may include a central processing unit (CPU), a graphics processing unit (GPU), both CPU and GPU, or other processing units or components known in the art. System memory 208 can be volatile and/or non-volatile computer-readable media including integrated or removable memory devices including random-access memory (RAM), read-only memory (ROM), flash memory, a hard drive or other disk drives, a memory card, optical storage, magnetic storage, and/or any other computer-readable media. The computer-readable media may be non-transitory computer-readable media. The computer-readable media may be configured to store computer-executable instructions that can be executed by the processor(s) 206 to perform the operations described herein. Additionally, the processor(s) 206 may possess local memory, which also may store program modules, program data, and/or one or more operating systems.

Example embodiments may be provided as a computer program item including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, example embodiments may also be provided as a computer program item including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

The system memory 208 of the off-board computing system 204 can store one or more parameter grids 214. As will be described in more detail below, a parameter grid 214 can define combinations of parameters that can be used during test events to measure and capture data about the machine 100. In some examples, a parameter grid 214 can be stored on in the system memory 208 of the off-board computing system 204 that is configured to send commands to the on-board computing system 202 during testing. In other examples, a parameter grid 214 can be prepared on an off-board computing system 204 and be loaded to the on-board computing system 202 prior to testing, such that system memory 208 of the on-board computing system 202 may also store a copy of one or more parameter grids 214.

The system memory 208 of the on-board computing system 202 can store channel data 216, such as channel data 216 measured and recorded on-board the machine 100 during testing according to a parameter grid 214 and/or during other operations of the machine 100. The channel data 216 can include measurements and other data provided by physical and/or virtual sensors about the state of the machine 100 during execution of test events defined by a parameter grid, and/or during regular operation of the machine 100. Channel data 216 recorded during test events and/or during regular operation of the machine 100 can also be transferred to the system memory 208 of the off-board computing system 204 for storage and/or analysis as described further below.

An on-board computing system 202, such as an ECM 118, can also include an input data receiver 218. The input data receiver 218 can receive an input command associated with an event, such as a velocity command or other command indicated by movement of a lever or a digital signal corresponding to other user input or a velocity instruction from autonomous operator software. The input data receiver 218 can also receive or retrieve other input data about the current state of the machine 100, such as channel data 216 about current pump pressures or pump commands and information about a current displacement of a valve 104.

The system memory 208 of the on-board computing system 202 can also store data for a control mapping model 220 and model weights 222. The control mapping model 220 can be a mathematical model or computational graph that uses model weights 222 to map input data to output data. For example, the control mapping model 220 can transform or map input data, such as a velocity command and other input data about the state of the machine 100, into a corresponding valve solenoid current or other electric current. The electric current determined by the control mapping model 220 can be an electric current that causes a valve 104 to open or close to a displacement that the control mapping model 220 predicts will, in combination with other aspects of the current state of the machine, result in movement of a hydraulically-controlled component at a velocity corresponding to the input command.

As will be explained in more detail below, in some examples the model weights 222 can be generated by a machine learning system 224 executing on an off-board computing system 204, and the model weights 222 can be transferred from the off-board computing system 204 to the system memory 208 of the on-board computing system 202 to be used by the control mapping model 220. The machine learning system 224 can be configured to use machine learning to train the model weights 222 based on testing data such that the model weights 222 map input data to an electric current for a valve 104 that is predicted to result in movement of a stick 108 and/or other hydraulically-controlled component at a velocity corresponding to an input velocity command.

Figure 3:
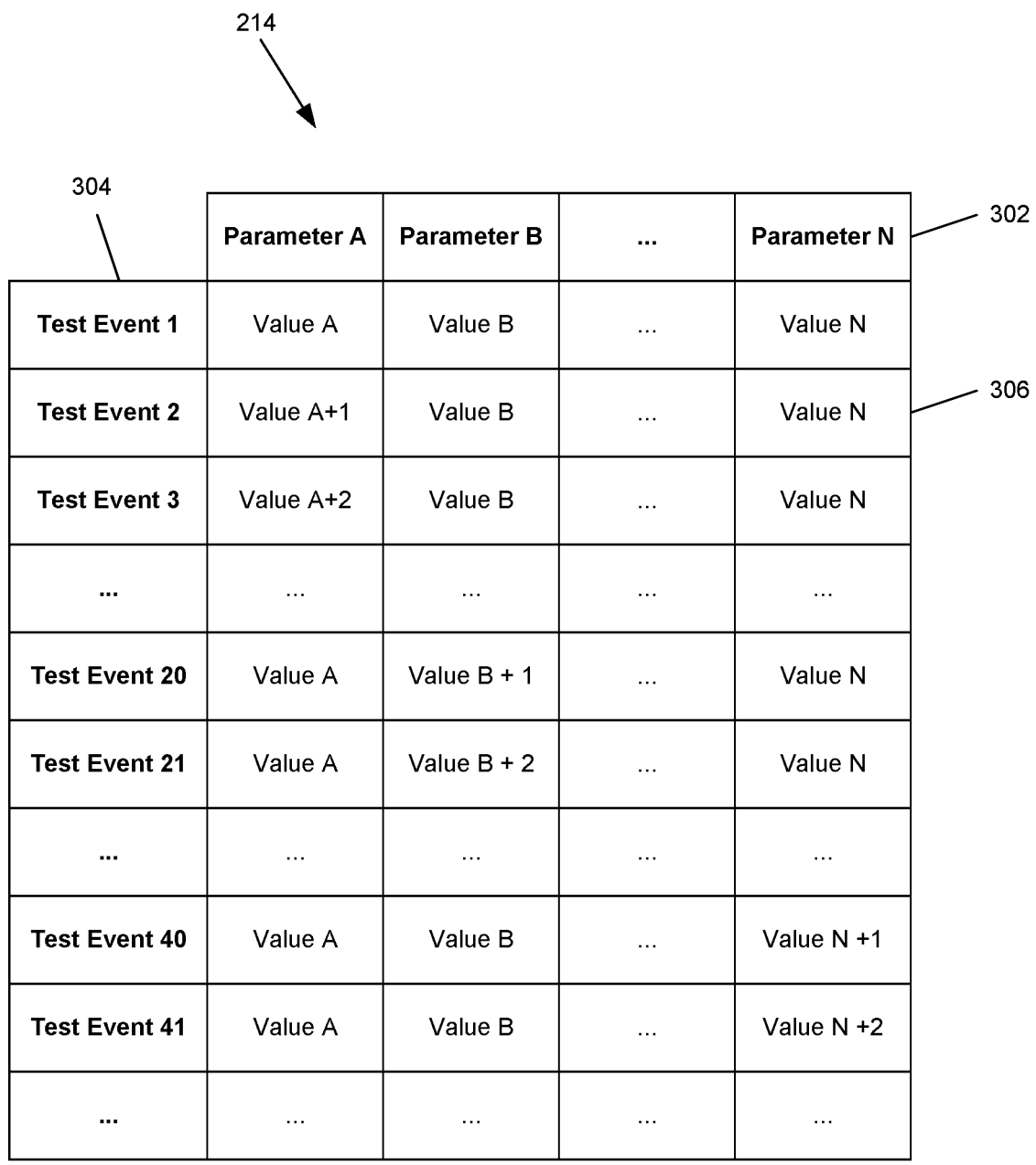
FIG. 3 depicts an example of a parameter grid.

FIG. 3 depicts an example of a parameter grid 214. A parameter grid 214 can be defined for a particular type of event or operation that a machine 100 can perform. For example, when the machine 100 is an excavator that can perform "stick-in" events, "stick-out" events, "boom-up" events, "boom-down" events, "bucket-curl" events, and "bucket-dump" events, six parameter grids 214 can be defined, one for each of these six types of events. The parameter grid 214 can define parameters 302 that can affect movement of a component of the machine 100 during performance of a type of event. The parameter grid 214 can also define multiple test events 304 with distinct combinations of values 306 for the parameters 302.

The parameters 302 of the parameter grid 214 can be variables that can be set on-board the machine 100 during testing and/or that can affect the movement and/or velocity of at least one machine component related to an event type. For example, when the machine 100 is an excavator and the event type is a "stick-in" event, columns of the parameter grid 214 may define parameters 302 including a boom position, a payload value, a pump current command that determines pump pressure, and a linkage valve electric current that corresponds to the displacement of a valve 104. In some examples, a pump current command controls a pump valve current and thus displacement of a valve 104, which itself can control a hydraulic flow that determines pump pressure. These parameters 302 can be selected for the "stick-in" event type for the excavator because the position of a boom 106, payload, pressure provided by a hydraulic pump 102, and/or the displacement of a valve 104 in the excavator can, in combination, together govern the resulting velocity of inward motion of a stick 108 of the excavator.

The parameter grid 214 can also define a series of different combinations of values 306 for the defined parameters 302 for different test events 304. Different test events 304 in a parameter grid 214 can relate to the same overall type of event, but be different test runs, sweeps, or sequences based on different initial values 306 for the parameters 302. For example, one row of the parameter grid 214 can define a first combination of a boom position, a pump command, and a valve displacement for a first test event 304, while a second row of the parameter grid 214 can define a second combination of a boom position, a pump command, and a valve displacement for a second test event 304. In some examples, the parameter grid 214 can keep values 306 of one or more parameters 302 constant between test events 304 that are sequential in the parameter grid 214, but change the value 306 of one or more other parameters 302. For example, the parameter grid 214 may keep values 306 for a boom position and pump command constant throughout a series of test events 304, but vary the valve displacement by a predefined amount between sequential test events 304. In this example, after a first set of test events 304 indicates constant values 306 for the boom position and pump command in combination with multiple possible values 306 for the valve displacement, a subsequent set of test events 304 in the parameter grid 214 can define a new constant value 306 for the boom position and/or pump command and again go through multiple possible values 306 for the valve displacement.

Overall, the parameter grid 214 can be defined to have a number of combinations of values 306 for the defined parameters 302 over multiple test events 304 to cover a state space that drives possible motions of one or more hydraulically-controlled components of a machine 100 during a particular type of event. As described below, the parameter grid 214 can be used during testing of a machine 100 to capture movement parameters associated with machine components and other channel data 216 that can be analyzed via machine learning.

Figure 4:
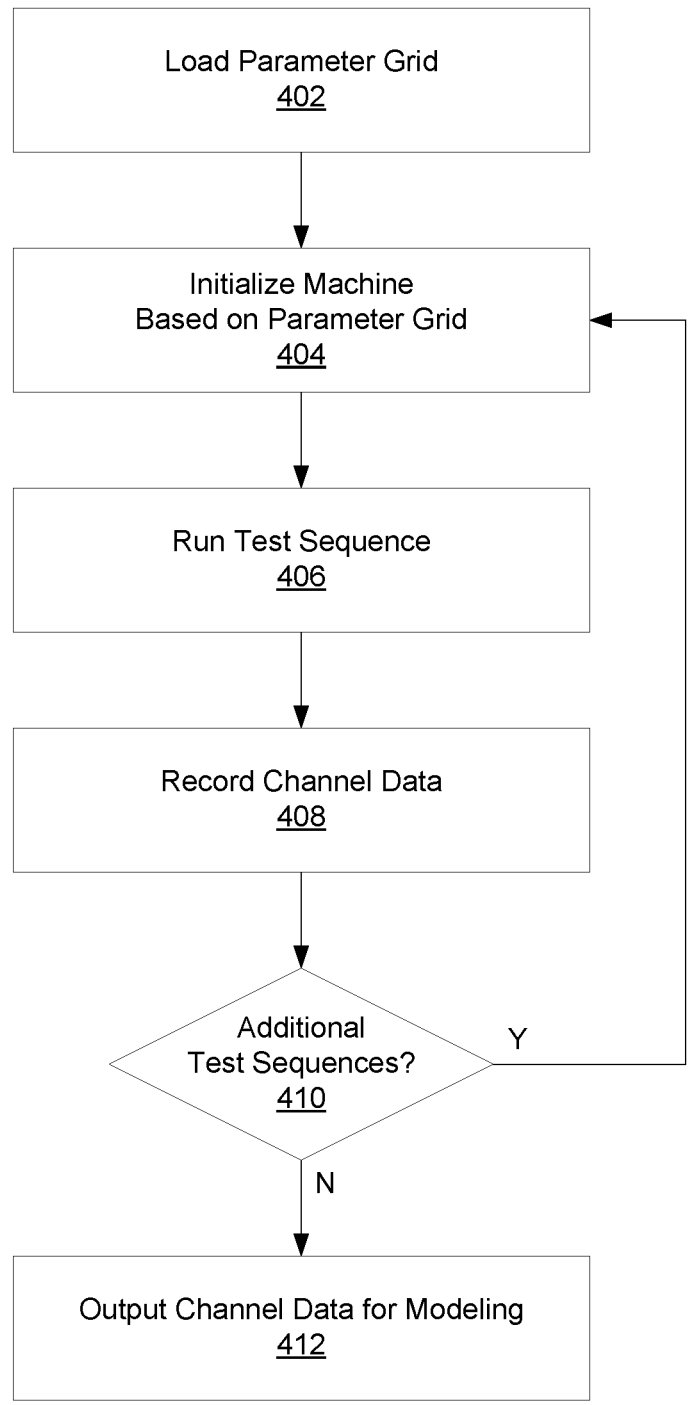
FIG. 4 depicts a flow chart of a process for capturing channel data during physical tests of a machine in a test environment according to values in a parameter grid.

FIG. 4 depicts a flow chart of a process for capturing channel data 216 during physical tests of a machine 100 in a test environment according to values 306 in a parameter grid 214. During FIG. 4, test events 304 can be performed by initializing the machine 100 by using fixed parameter overrides corresponding to values 306 preset in the parameter grid 214 for the test events 304. Over multiple test events 304, results of various combinations of the values 306 defined in the parameter grid 214 can be observed and recorded, and the results can later be used to determine model weights 222 for the control mapping model 220 via machine learning. The process of FIG. 4 can be performed multiple times to capture different sets of channel data 216 associated with distinct types of events associated with a machine 100 using different parameter grids 214. For example, when the machine 100 is an excavator that can perform "stick-in" events, "stick-out" events, "boom-up" events, "boom-down" events, "bucket-curl" events, and "bucket-dump" events, and channel data 216 is to be captured for these six types of events, the process of FIG. 4 can be performed six times, once for each of the six types of events.

At operation 402, a parameter grid 214 can be loaded to a test controller. For example, in some cases the test controller can be an off-board computing system 204, such as a laptop computer or other controller, connected to the machine 100 via a wired or wireless connection to at least partially control the machine 100 during testing. The parameter grid 214 can have been defined with values 306 of parameters 302 for different test events 304 to cover a state space that drives possible motions of one or more hydraulically-controlled components of a machine 100 during a particular type of event. In some examples, the parameter grid 214 can have been defined manually. In other examples, some or all aspects of the parameter grid 214, such as its values 306 for different test events 304, can have been defined programmatically. For example, computer-executable instructions can be executed by a processor 206 of an off-board computing system 204 to automatically generate a parameter grid 214 by varying values 306 of one or more parameters 302 at successive test events 304 by predefined increments.

At operation 404, the parameter grid 214 can be used to initialize the machine 100 for a test event 304. To initialize the machine 100 for a particular test event 304, components of the machine 100 can be set according to values 306 defined for the test event 304 in the parameter grid 214. For example, if for a certain test event 304 the parameter grid 214 defines a specific boom position, a specific pump command, and a specific valve displacement, a boom 106 of the machine 100 can be moved to the defined boom position, a hydraulic pump 102 can be set according to the defined pump command, and a valve 104 can be set to be opened according to the defined valve displacement.

In some examples, test controllers and/or other test equipment, such as the ECM 118 or other on-board controllers, off-board controllers, mechanical elements, robotic elements, and/or other elements can be used to automatically configure components of the machine 100 according to combinations of values 306 in the parameter grid 214. For example, a processor 206 of an off-board test controller can determine values 306 of the parameter grid 214 for a particular test event 304, and output the values 306 or corresponding instructions to an on-board controller of the machine 100 that executes computer-executable instructions to generate and output signals that cause components of the machine 100 to be moved or adjusted automatically without human input based on the values 306 associated with the test event 304. This can reduce the risk of human error in initializing components of the machine 100 according to the parameter grid 214 for each test event 304, and allow testing based on multiple successive test events 304 in the parameter grid 214 to proceed automatically without human intervention.

At operation 406, after initializing components of the machine 100 for a test event 304 according to values 306 for that test event 304 in the parameter grid 214, the test controller can run the test event 304 by activating the machine 100 such that components of the machine 100 move based on the state of the components initialized during operation 404. For example, when an excavator was initialized based on a boom position, a pump command, and a valve displacement defined for a test event 304 in a parameter grid 214, the hydraulic pump 102 of the excavator can be activated such that the stick 108 of the excavator moves as a result of the preset boom position, pump command, and valve displacement.

At operation 408, channel data 216 can be measured and recorded during execution of the test event 304 using physical and/or virtual sensors on or around the machine 100 as the machine 100 moves. The measured and recorded channel data 216 can indicate movement parameters of a component of the machine 100 measured during execution of the test event 304, including velocity, acceleration, positional information, and/or any other movement parameters.

For example, positional sensors, such as inertial measurement units (IMU) or string potentiometers, can be used to track the position of a stick 108 or other machine component through three-dimensional space during execution of a test event 304. This positional data, such as spatial coordinates or other information indicating the position of a component over time, can be used to measure or derive movement parameters of the stick 108 or other machine component during execution of the test event 304, including velocity of the component, acceleration of the component, and/or other positional data. In some examples, kinematic analysis, derivative analysis, or any other type of analysis can be used to derive velocity parameters, acceleration parameters, and/or any other type of movement parameters associated with the machine component from measurements taken during execution of a test event 304.

In addition to determining velocity information and/or other movement parameters associated with machine components during execution of a test event 304, other channel data 216 can also be measured and recorded during execution of the test event 304. For example, channel data 216 such as head-end pressure, rod-end pressure, other pressures associated with hydraulic cylinders, pump pressure, engine speed, torque, and/or other measurements can be measured or derived during execution of test events 304.

In some examples, channel data 216 measured during execution of a test event 304, such as a velocity of a stick 108 measured during execution of a test event 304 as a response to preset values 306 in the parameter grid 214 for a test event 304, can be recorded in a data file stored in system memory 208 at the test controller. In other examples, the measured channel data 216 can be transferred from the test controller to an off-board computing system 204 for storage in system memory 208 of the off-board computing system 204.

At operation 410, the test controller can determine if there are additional test events 304 in the parameter grid 214 that are still to be performed. For example, the test controller can determine if all the test events 304 in the parameter grid 214 have been performed. If no additional test events 304 are to be performed, the test controller can output the recorded channel data 216 for modeling at operation 412. For example, the recorded channel data 216 can be output for use in training and/or verifying a machine learning model, as described below with respect to FIG. 5. However, if additional test events 304 in the parameter grid 214 are to be performed, the test controller can return to operation 404 and re-initialize the machine 100 for a new test event 304 based on a new combination of values 306 associated with a subsequent test event 304. In other examples, the test controller may output recorded channel data 216 after each test event 304, rather than waiting until all test events 304 have been completed.

Figure 5:
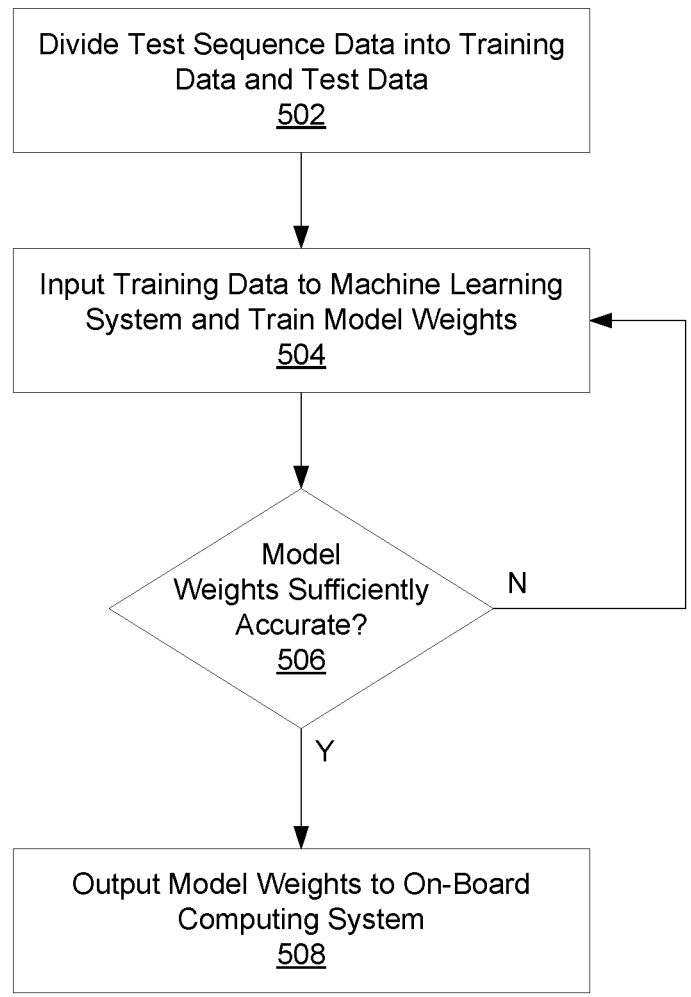
FIG. 5 depicts a flow chart of a process for training model weights based on values of the parameter grid and corresponding channel data recorded during execution of test events.

FIG. 5 depicts a flow chart of a process for training model weights 222 based on values 306 of the parameter grid 214 and corresponding channel data 216 recorded during execution of test events 304. For example, an off-board computing system 204 can use the process of FIG. 5 with channel data 216 captured for a particular event type during execution of multiple test events 304 using the data-capture process shown in FIG. 4 to train model weights 222 that can then be transferred to an on-board computing system 202. The model weights 222 can be trained by a machine learning system 224 that uses one or more machine learning algorithms or architectures, such that the model weights 222 can predict an electric current for a valve 104 that, in combination with other attributes of a state of a machine 100, is expected to result in a velocity of a machine component that corresponds to an input velocity command. The process of FIG. 5 can be performed by an off-board computing system 204, which can be the same or a different off-board computing system 204 that defined a parameter grid 214 or served as a test controller during the process of FIG. 4.

At operation 502, the off-board computing system 204 can divide data corresponding to test events 304, including values 306 of the parameter grid 214 and corresponding recorded channel data 216, into a training dataset and a test dataset. The test dataset can be held back and not used during training of the model weights 222. As will be discussed further below, after the model weights 222 have been trained using some or all of the training dataset, the accuracy of the model weights 222 can be verified based on whether the model weights 222 can be used to make predictions that sufficiently match the test dataset. For example, data associated with ten percent of the test events 304 can be withheld as test data and not used to train the model weights 222, while data associated with the other ninety percent of the test events 304 can be used as training data to train the model weights 222. In other examples, any other amount or percentage of data for test events 304 can be held back as test data that is not used to train the model weights 222.

The training dataset can itself be divided into training data and training labels. When the training data is used as input to the machine learning system 224 during training of the model weights 222, the training labels can be the target output that the model weights 222 should produce based on corresponding training data input. Here, the training labels can be valve displacements, or corresponding electric currents that cause those valve displacements. The training data can be other values 306 from the parameter grid 214 and/or measured channel data 216, such as velocity measurements, component positions, pressure settings or measurements, velocity commands, and/or other measured channel data 216 or values 306 that were preset in the parameter grid 214. Accordingly, a valve displacement defined for a certain test event 304 in the parameter grid 214 can be used as a training label, while data that was predefined in the parameter grid 214 for that test event 304 and/or velocity measurements or other data measured during execution of a test event 304 can be used as training data corresponding to that training label. For example, although during execution of a test event 304 for a "stick-in" event a valve 104 may have been preset according to a particular valve displacement in the parameter grid 214, and a resulting velocity of the stick 108 was measured as channel data 216, when training the model weights 222 using the machine learning system 224, the measured velocity can be part of the training data and the corresponding valve displacement can be the training label that should be predicted from the training dataset.

At operation 504, the training data and corresponding training labels can be provided to the machine learning system 224 to train a set of model weights 222. The machine learning system 224 can have a deep learning framework, and can have various types of architectures, including a multi-layer perceptron, a complex neural network, a long short-term memory network, or other architectures. As one non-limiting example, the machine learning system 224 can have an architecture with a Radial Basis Function (RBF) network followed by a dense fully-connected neural network layer. In some examples, the machine learning system 224 can at least partially train model weights 222 based on backpropagation.

The machine learning system 224, such as one using an RBF network model, can use model parameters to regress inputs to outputs. The model parameters can be weights, biases, basis vectors, or other types of values, but are referred to herein as model weights 222. The machine learning system 224 may use or train any number of model weights 222. In some examples the machine learning system 224 may use or train tens or hundreds of model weights 222, but can use or train any other number of model weights 222 in other examples. In some examples, the model weights 222 may at first be initialized to random values. However, over time, the framework of the machine learning system 224 can adjust the model weights 222 until the model weights 222 can operate on training data to produce the corresponding training labels to a degree that is considered sufficient, as discussed below.

Iterative adjustment of the model weights 222 can be based at least in part on backpropagation such that the model weights 222 converge on a minimal loss such that they can accurately predict the expected training labels from corresponding training data. For example, the framework of the machine learning system 224 can adjust the model weights 222 so that training data associated with a test event 304, such as a velocity measurement, component position, pressure setting, and/or other values, can be mapped based on the model weights 222 to a corresponding training label indicating a valve displacement that corresponded to the training data.

At operation 506, it can be determined if the model weights 222 have been sufficiently trained such that a loss metric meets a predefined threshold. In some examples, test data held back from data associated with test events 304 can be run through the machine learning system 224 to produce output data based on current model weights 222 trained by the machine learning system 224. The output can be compared against the test labels that were held back from the data associated with the test events 304, and a loss metric between output of the model and the expected test labels can be computed. In some examples, the loss metric can be computed as a mean-squared error, with lower values of the mean-squared error indicating closer matches between output of the model and the test labels.

In these examples, the training of the model weights 222 can be determined to be sufficiently accurate if the computed loss metric, such as a mean-squared error, is below a predefined allowable threshold. If the computed loss metric is not found to be below the predefined allowable threshold at operation 506, operations 504 and 506 can be repeated to further adjust the model weights 222 until the computed loss metric falls below the predefined allowable threshold and the model weights 222 are determined to be sufficiently accurate.

In other examples, the computed loss metric may be assumed to be minimized, and thus be assumed to meet the predefined threshold such that the model weights 222 can be considered sufficiently accurate, after a predefined number of training iterations have been performed to adjust the model weights 222. For example, although a loss metric, such as a mean-square error, could be computed at each pass through operation 506 as discussed above, experiments with sample data have shown that the loss metric may reach or trend toward a minimum value before the $50^{th}$ iteration and does not rise during subsequent iterations, indicating that the training does not overfit to the data past the $50^{th}$ iteration. Accordingly, based on these experiments, in some examples a counter may track the number of iterations through operation 506, and the model weights 222 can be assumed to accurate at operation 506 when an iteration counter reaches a predefined value, such as the $50^{th}$ iteration, without explicitly calculating the loss metric during each iteration.

After the model weights 222 have been determined to be sufficiently accurate at operation 506, possibly after a number of iterations through operations 504 and 506 to iteratively adjust the model weights 222 during training using machine learning, the final model weights 222 can be output by the off-board computing system 204 and loaded onto an on-board computing system 202 of a machine 100. In some examples, the machine 100 provisioned with the model weights 222 can be the same machine 100 used during testing. However, in other examples the machine 100 provisioned with the model weights 222 can be a different machine 100 that is equivalent to the machine 100 used during testing. For example, when testing was performed according to the process of FIG. 3 using a test excavator in a test environment, and the model weights 222 were determined using machine learning on an off-board computing system 204, those model weights 222 can then be provisioned into on-board computing systems 202 of production excavators that are equivalent to the test excavator.

Because the training and test datasets used in the process of FIG. 5 can correspond with test events 304 performed for a specific type of event, the model weights 222 determined and output using the process of FIG. 5 can also be specific to that type of event. Accordingly, when a machine 100 can perform different types of events, the process of FIG. 5 can be repeated to determine model weights 222 specific to each type of event. For example, when the machine 100 is an excavator that can perform "stick-in" events, "stick-out" events, "boom-up" events, "boom-down" events, "bucket-curl" events, and "bucket-dump" events, the process of FIG. 5 can be performed six times to determine different sets of model weights 222 that are specific to each of the six types of events.

Figure 6:
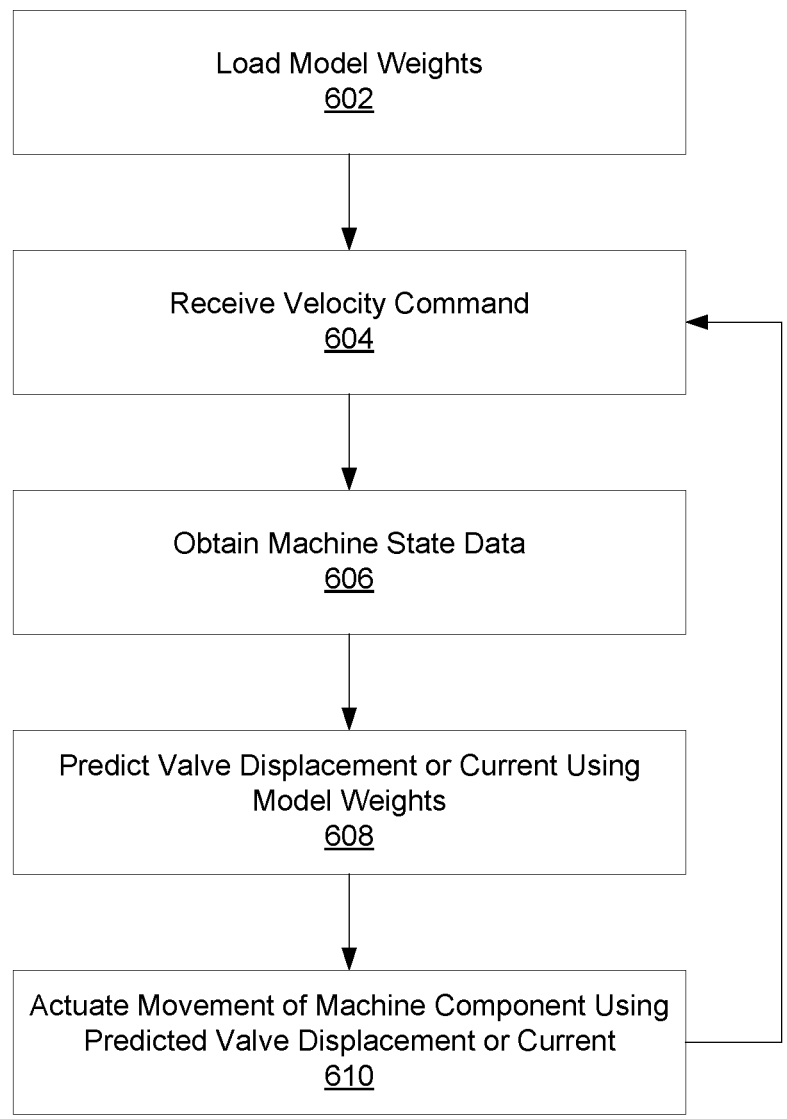
FIG. 6 depicts a flow chart of a process for using model weights on a machine to predict electric currents for valve displacements based on input data.

FIG. 6 depicts a flow chart of a process for using model weights 222 on a machine 100 to predict electric currents for valve displacements based on input data. For example, the model weights 222 may be used by a control mapping model 220 on an ECM 118 or other on-board computing system 202 to map input data into a corresponding electric current, such as a valve solenoid current, that causes a valve 104 to open or close to a valve displacement that, in combination with other attributes of the state of the machine 100, leads to an expected velocity of a hydraulically-controlled machine component. In other examples, the model weights 222 can be used to predict a valve displacement that is expected to lead to the expected velocity of the machine component, and other processing can be used to determine an electric current that will cause the valve 104 to open to the predicted valve displacement.

At operation 602, model weights 222 can be loaded onto an on-board computing system 202 of a machine 100. As discussed above, the model weights 222 may be determined using a machine learning system 224 on an off-board computing system 204 by training the model weights 222 based on data associated with test events 304 run on the machine 100 or an equivalent machine 100. In some examples, the model weights 222 may be expressed in one format or programming language on the off-board computing system 204, but be converted to another format or programming language used by the on-board computing system 202 of the machines 100. For example, the model weights output at operation 506 can be converted into a configuration file that can be loaded or flashed onto an on-board computing system 202 of a machine 100 to store or populate model weights 222 used by the control mapping model 220 of an on-board computing system 202 as shown in FIG. 2. As discussed above, different sets of model weights 222 can be determined for different types of events that a machine 100 can perform. Accordingly, different sets of model weights 222 specific to different types of events can be loaded onto the machine 100 during operation 602.

At operation 604, the on-board computing system 202 can receive a velocity command associated with a hydraulically-controlled component of the machine 100. In some examples, the velocity command can correspond to a physical lever movement or other activation of a hardware control. For example, the degree to which a human operator moves a lever provided in a cab of an excavator to control movement of a stick 108 can indicate a velocity of the stick 108 that the human operator is requesting and expecting. In other examples, the on-board computing system 202 can receive a direct instruction or signal to move a hydraulically-controlled component of the machine 100 at a requested velocity, for instance as an electronic instruction from a software-controlled autonomous operator or from user input that directly requests movement of the component at a specified velocity.

In some examples, the velocity command may directly or indirectly indicate a type of a requested event. For example, when the velocity command is received as inward movement of a lever associated with a stick 108, the on-board computing system 202 may determine that the operator is requesting a "stick-in" event. The on-board computing system 202 may select one of multiple sets of model weights 222 that corresponds to the indicated event type. For instance, when the received velocity command is instead an outward movement of a lever that corresponds to a "stick-out" event, the on-board computing system 202 can determine that it should use model weights 222 that have been determined specifically for the "stick-out" event type. In other examples, input velocity commands or other input for multiple types of events can be received at substantially the same time, and the on-board computing system 202 can select model weights 222 for each type of event such that it can use different sets of model weights 222 can be used to map input data to output data for multi-function control of the machine 100. In some of these examples, different types of input data and/or model weights can be mapped to output data substantially simultaneously or in parallel. In other examples, different types of input data and/or model weights can be mapped to output data in round-robin order or in a series loop.

At operation 606, the on-board computing system 202 can also obtain machine state data about the current state of the machine 100. This machine state data can include channel data 216 measured by sensors on the machine 100 or that is otherwise known to the on-board computing system 202, such as current component positions, hydraulic cylinder pressures, and pump pressures. The machine state data can correspond to the types of data that were used as training data for the model weights 222 in the process of FIG. 5. If types of channel data 216 or other data that were used during training of the model weights 222 are not available at operation 606, such as if sensors have failed and corresponding channel data 216 cannot be read, in some examples the missing data can be inferred from previous measurements, trends of how the data has progressed over time, or estimated in other ways, or default values for the missing data can be used.

In some examples, velocity commands and/or machine state data can be sanitized and/or scaled before being passed to the control mapping model 220. For example, the control mapping model 220 may have expected distribution of input values, such as −1 to 1, and the ECM 118 can thus scale input values to the expected distribution.

At operation 608, the control mapping model 220 of the on-board computing system 202 can use the model weights 222 to predict an electric current, such as a valve solenoid current, for a valve 104 from the velocity command and machine state data. For example, the on-board computing system 202 can input a desired velocity derived from the received velocity command, and the machine state data, into its control mapping model 220. The control mapping model 220 on the on-board computing system 202 can have the same architecture as the machine learning system 224 on the off-board computing system 204 that trained the model weights 222, such that the control mapping model 220 can use the provided model weights 222 to map the same types of input data to the same types of output data. For example, like the machine learning system 224, the control mapping model 220 can have an RBF network model architecture that uses a set of model weights 222 that corresponds to a requested event type to map an expression of a desired velocity and machine state data into an electric current for a valve 104 that will cause the valve 104 to open or close to a specific valve displacement that in turn will cause a hydraulically-controlled component to move at the velocity desired by the operator. Alternately, the control mapping model 220 can use model weights 222 to map input data directly into a particular valve displacement, and other elements of the on-board computing system 202 can determine a corresponding valve current that can cause the valve 104 to move to that valve displacement. For example, a look-up table or other empirical data can be stored in the system memory 208 of an on-board computing system 202 that can be used by a current determiner of the on-board computing system 202 to determine a valve current that will move a valve 104 from its current displacement to the new valve displacement determined by the control mapping model 220.

In some examples, values predicted by the control mapping model 220 may be on a particular scale, such as values from −1 to 1, and the on-board computing system 202 can scale and/or offset those values to values that can be used in the machine 100 to move valves 104 to corresponding valve displacements.

At operation 610, a hydraulically-controlled machine component can be actuated by opening or closing the valve 104 according to the predicted electric current and/or valve displacement. For example, the adjustment of the valve 104 based on the prediction can adjust pressure on hydraulic cylinders, causing them to move and in turn move a hydraulically-controlled component such as a boom 106, stick 108, or bucket 110. Because the model weights 222 were trained using a training dataset that expressed measured velocities of the machine component caused in part by different combinations of multiple variables including valve displacements and other channel data 216 during testing, the electric current and/or valve displacement predicted using those model weights 222 can be expected to, in combination with current attributes of the state of the machine 100, result in movement of the machine component at the velocity requested and expected by the operator. In other words, although during testing valve displacements were preset according to test events 304 in a parameter grid 214, and velocities of a machine component caused by various combinations of those valve displacements along with other variables were measured, in operation the on-board computing system 202 can use the model weights 222 to predict an electric current for a valve displacement that, in combination with current known values for other variables about the state of the machine 100, will result in movement of the machine component at the velocity desired by the operator.

After operation 610, in some examples the on-board computing system 202 can wait to receive the next velocity command at operation 604. In some cases, the next velocity command may be associated with the same event type as the previous velocity command, indicating that the same set of model weights 222 can be used to predict valve displacement or current in response to the new velocity command. For example, two successive velocity commands may both be about "stick-in" events, but differ in the requested velocity for the stick 108. In other cases, the next velocity command may be associated with a different event type as the previous velocity command, indicating that a different set of model weights 222 should be used to predict valve displacement or current in response to the new velocity command. In other examples, the on-board computing system 202 can be configured to use different sets of model weights 222 corresponding to different types of events substantially simultaneously to enable multi-function control, for instance by mapping different types of input data to output data using different sets of model weights 222 in parallel or in a round-robin or series-loop implementation.

Additionally, after a next velocity command is received at a new loop through operation 604, new machine state data can be obtained at operation 606. Aspects of the machine 100 may have changed relative to the last pass through operation 606, and accordingly the on-board computing system 202 can obtain the most up-to-date measurements of channel data 216 or other state data at a new pass through operation 606 so that a prediction can be made at operation 608 based at least in part on up to date data about the state of the machine 100. For example, when a previous velocity command resulted in movement of the boom 106 at operation 610, hydraulic cylinder pressures, pump pressures, component locations, and/or other data may have changed to new values. These new values can be obtained and considered when making a prediction in response to a subsequent velocity command.

INDUSTRIAL APPLICABILITY

The systems and methods described herein can cause a machine 100 to determine predicted valve displacements or corresponding electric currents that are expected to, in combination with other attributes of the state of the machine 100, result in velocity of a machine component that finely matches a velocity command input by an operator. Many operators have years of experience with conventional hydraulic machines that were mechanically actuated, such that they could intuitively feel how their movements of levers or other controls would translate into machine movements. Such a direct mechanical link may be absent in machines that are electrohydraulically controlled, and operators may become frustrated if their velocity commands do not result in movement of machine components at velocities the operators are expecting. Additionally, if velocity commands do not result in machine movements that operators expect, it can also impact the work performed by the machine 100. For example, when an excavator is used to grade a worksite and the operator wants to grade the surface with a variance of plus or minus one inch, any mismatch between machine movements the operator requests and what the machine performs can greatly impact the ability of the operator to complete the project.

One solution may be to manually tune a machine 100 such that input commands result in expected movements. However, this can often involve performing tests on a test machine, manually tuning control variables based on the tests, and performing new tests. This process can take months or even years of testing and manually retuning variables, which can significantly delay deployment or sale of new machines.

Using machine learning to generate model weights from a single set of test sequences performed automatically according to a parameter grid 214 as described herein can greatly speed up this process. The automatically-generated model weights can also reduce error in the ultimate movements of the machine 100 relative to input commands. Additionally, because the parameter grid 214 can be designed with multiple combinations of values for parameters 302 that can cover a state space that drives possible motions of one or more hydraulically-controlled components of a machine 100 during a particular type of event, a machine learning model can be trained to produce model weights that can predict electric currents for valve displacements that will cause expected velocities to occur regardless of other variables about the current state of the machine 100. Accordingly, the systems and methods described herein can cause movements of a machine 100 to match velocity commands from an operator in a repeatable and expected manner.

While aspects of the present disclosure have been particularly shown and described with reference to the embodiments above, it will be understood by those skilled in the art that various additional embodiments may be contemplated by the modification of the disclosed machines, systems, and method without departing from the spirit and scope of what is disclosed. Such embodiments should be understood to fall within the scope of the present disclosure as determined based upon the claims and any equivalents thereof.

What is claimed is:

1. A machine control system, comprising:
memory storing a set of model weights trained using a machine learning system based on a training dataset, wherein:
the training dataset correlates preset displacements for a hydraulic valve of a machine to movement parameters of a component of the machine measured when the hydraulic valve is set according to the preset displacements and the component is moved at least in part by the hydraulic valve;
an input data receiver configured to receive:
a velocity command indicating a requested velocity of the component of the machine; and
machine state data from one or more sensors positioned on the machine; and
a control mapping model configured to use the set of model weights to map a combination of the velocity command and the machine state data into a predicted displacement of the hydraulic valve that causes movement of the component at the requested velocity in response to the velocity command; and
the control mapping model causes the hydraulic valve to move to the predicted displacement.

2. The machine control system of claim 1, wherein the velocity command is an operator command input by an operator of the machine via a control element of the machine.

3. The machine control system of claim 1, wherein the movement parameters include at least one of positional coordinates, velocity, or acceleration of the component as measured during testing when the hydraulic valve is set according to the preset displacements and the component is moved at least in part by the hydraulic valve.

4. The machine control system of claim 1, wherein the training dataset correlates preset displacements for the hydraulic valve along with other preset parameter values to the movement parameters.

5. The machine control system of claim 1, wherein the machine learning system comprises a radial basis function network with a fully-connected neural network layer.

6. The machine control system of claim 5, wherein the radial basis function network is configured to train the set of model weights at least partially using backpropagation to adjust the set of model weights over a plurality of iterations.

7. The machine control system of claim 1, wherein the control mapping model causes an electric current to be provided to the hydraulic valve that causes the hydraulic valve to move to the predicted displacement.

8. The machine control system of claim 7, wherein the hydraulic valve comprises a valve solenoid, and the electric current is a valve solenoid current.

9. The machine control system of claim 1, wherein the memory stores a plurality of sets of model weights corresponding to different types of events, and wherein the control mapping model selects the set of model weights from the plurality of sets of model weights based on an event type associated with the velocity command.

10. The machine control system of claim 1, wherein the machine state data includes one or more of: pump pressure, hydraulic cylinder pressure, and positional data associated with the component or other components of the machine.

11. A machine, comprising:
a substantially rigid frame;
a hydraulic valve configured to open to different displacements;
a component connected to the substantially rigid frame, wherein the hydraulic valve is configured to move the component relative to the substantially rigid frame;
one or more sensors carried by the machine that are configured to measure machine state data;
a machine control system configured to control displacement of the hydraulic valve, wherein the machine control system comprises:
  memory storing a set of model weights trained using a machine learning system based on a training dataset, wherein:
    the training dataset correlates preset displacements for the hydraulic valve to movement parameters of the component measured when the hydraulic valve is set according to the preset displacements and the component is moved at least in part by the hydraulic valve;
  an input data receiver configured to receive:
    a velocity command indicating a requested velocity of the component; and
    the machine state data from the one or more sensors; and
  a control mapping model configured to use the set of model weights to map a combination of the velocity command and the machine state data into a predicted displacement of the hydraulic valve that causes movement of the component at the requested velocity in response to the velocity command; and
  the control mapping model causes the hydraulic valve to move to the predicted displacement.

12. The machine of claim 11, wherein:
the machine learning system comprises a radial basis function network with a fully-connected neural network layer, and
the machine learning system is configured to train the set of model weights at least partially using backpropagation to adjust the set of model weights over a plurality of iterations.

13. The machine of claim 11, wherein:
the hydraulic valve comprises a valve solenoid, and
the control mapping model causes a valve solenoid current to be provided to the valve solenoid to cause the hydraulic valve to move to the predicted displacement.

14. The machine of claim 11, wherein:
the memory of the machine control system stores a plurality of sets of model weights corresponding to different types of events, and
the control mapping model selects the set of model weights from the plurality of sets of model weights based on an event type associated with the velocity command.

15. The machine of claim 11, wherein the machine state data includes one or more of: pump pressure, hydraulic cylinder pressure, and positional data associated with the component or other components of the machine.

16. A method, comprising:
obtaining test sequence data by performing a plurality of test sequences on a machine according to a parameter grid that defines a plurality of predefined valve displacements, wherein performing a first test sequence of the plurality of test sequences includes:
  setting a hydraulic valve to a first valve displacement of the plurality of predefined valve displacements;
  actuating the hydraulic valve, wherein actuating the hydraulic valve causes movement of a component of the machine; and
  measuring first test sequence data indicative of movement of the component caused by actuation of the hydraulic valve in association with the first valve displacement;
training a set of model weights using a machine learning system by:
  using the test sequence data in training data;
  using the plurality of predefined valve displacements in training labels; and
  iteratively adjusting the set of model weights until the set of model weights predicts the training labels from the training data such that a loss metric is below a predefined threshold;
receiving a velocity command indicating a requested velocity of the component;
receiving machine state data from one or more sensors on the machine; and
generating a predicted displacement of the hydraulic valve by using the set of model weights to map a combination of the velocity command and the machine state data to the predicted displacement,
  wherein controlling displacement of the hydraulic valve, based at least in part on the predicted displacement, causes movement of the component at the requested velocity in response to the velocity command.

17. The method of claim 16, wherein:
the machine learning system comprises a radial basis function network with a fully-connected neural network layer, and
the machine learning system is configured to train the set of model weights at least partially using backpropagation to iteratively adjust the set of model weights over a plurality of iterations.

18. The method of claim 16, wherein:
the hydraulic valve comprises a valve solenoid, and
controlling displacement of the hydraulic valve is based on a valve solenoid current provided to the valve solenoid that causes the hydraulic valve to move to the predicted displacement.

19. The method of claim 16, further comprising:
determining an event type associated with the velocity command; and selecting, from a plurality of sets of model weights that correspond to different types of events, the set of model weights associated with the event type.

20. The method of claim 16, wherein the machine state data includes one or more of pump pressure, hydraulic cylinder pressure, and positional data associated with the component or other components of the machine.

* * * * *